United States Patent

Mayr

[11] Patent Number: 6,058,842
[45] Date of Patent: May 9, 2000

[54] BEARING ASSEMBLY FOR A MOVABLE ROLLER OF A PRINTING MACHINE

[75] Inventor: Robert Mayr, Neusäss, Germany

[73] Assignee: MAN Roland Druckmaschinen AG, Offenbach am Main, Germany

[21] Appl. No.: 09/073,592

[22] Filed: May 6, 1998

[30] Foreign Application Priority Data

May 7, 1997 [DE] Germany ............................ 197 19 304

[51] Int. Cl.[7] ...................................................... B41F 31/32
[52] U.S. Cl. ......................... 101/480; 101/349.1; 101/207
[58] Field of Search ................................. 101/148, 350.1, 101/349.1, 348, 143, 144, 145, 351.1, 351.2, 247, 206, 207, 209, 216, 217, 218, 480

[56] References Cited

U.S. PATENT DOCUMENTS

| | | | |
|---|---|---|---|
| 5,025,724 | 6/1991 | Holl et al. ................................ | 101/148 |
| 5,511,475 | 4/1996 | Phizenmaier ........................ | 101/352.05 |
| 5,617,789 | 4/1997 | Achelpohl et al. ...................... | 101/216 |
| 5,906,162 | 5/1999 | Kolbe et al. ........................ | 101/352.01 |

FOREIGN PATENT DOCUMENTS 44 00 563 A1  7/1995  Germany .......................... B41F 31/36

*Primary Examiner*—Edgar Burr
*Assistant Examiner*—Daniel J. Colilla
*Attorney, Agent, or Firm*—Cohen, Pontani, Lieberman & Pavane

[57] ABSTRACT

A bearing assembly for an inking or wetting device of a printing press which quickly adjusts and readjusts a position of a first roller against a second and third roller includes a movable carrier plate on which a bearing assembly holding the first roller is mounted. The carrier plate rests against couplings of quadrilateral mechanisms which are positioned in relation to stops on bearings of the second and third rollers. As the position of the second and third rollers is adjusted for wear, the carrier plate follows the stops via the couplings so that the first roller automatically follows the second and third rollers during operation.

9 Claims, 3 Drawing Sheets

BEARING ASSEMBLY FOR A MOVABLE ROLLER OF A PRINTING MACHINE

BACKGROUND OF THE INVENTION

1. Field of the Invention

The present invention relates to a bearing assembly for a movable first roller that is movable for adjustment and readjustment of a position in a gap between a second and third roller of an inking or wetting device of a printing machine.

2. Description of the Related Art

A German prior art reference DE 44 00 563 A1 discloses a prior art bearing assembly for a movable roller that is urged by a spring between two adjacent distribution cylinder rollers for the purpose of adjustment and readjustment. The movable roller is pivotably arranged about a pivot axis with respect to a base of the bearing assembly and by the urgency of a spring, the movable roller pivots toward and rests on the two distribution cylinder rollers in the gap between the two distribution cylinder rollers. A leaf spring balances the intrinsic weight of the movable roller. The leaf spring is adjusted in accordance with the position of the movable roller about the pivot axis so that the movable roller is urged against the two distribution rollers with a uniform force in all positions about the pivot axis. Instead of distribution cylinder rollers, the movable roller may also interact with non-stationary rollers. In this case, the amount of required position change of the movable roller is even greater.

SUMMARY OF THE INVENTION

The object of the invention is to provide a bearing assembly for positioning a movable roller against one or more partner rollers with a specific force for adjustment and readjustment in a manner uninfluenced by the weight of the movable roller.

The object is attained according to the invention in a generic bearing assembly wherein couplings provide the distancing of the first roller from the second and third rollers, so that the weight of the first roller does not influence the position. Upon changes in the location of the second and/or third roller, the couplings are readjusted, so that the weight-independent distances are maintained and the roller can be precisely and simply readjusted. This readjustment may also be automated.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like characters denote similar elements throughout the several views.

DETAILED DESCRIPTION OF THE PRESENTLY PREFERRED EMBODIMENTS

Figure 1:
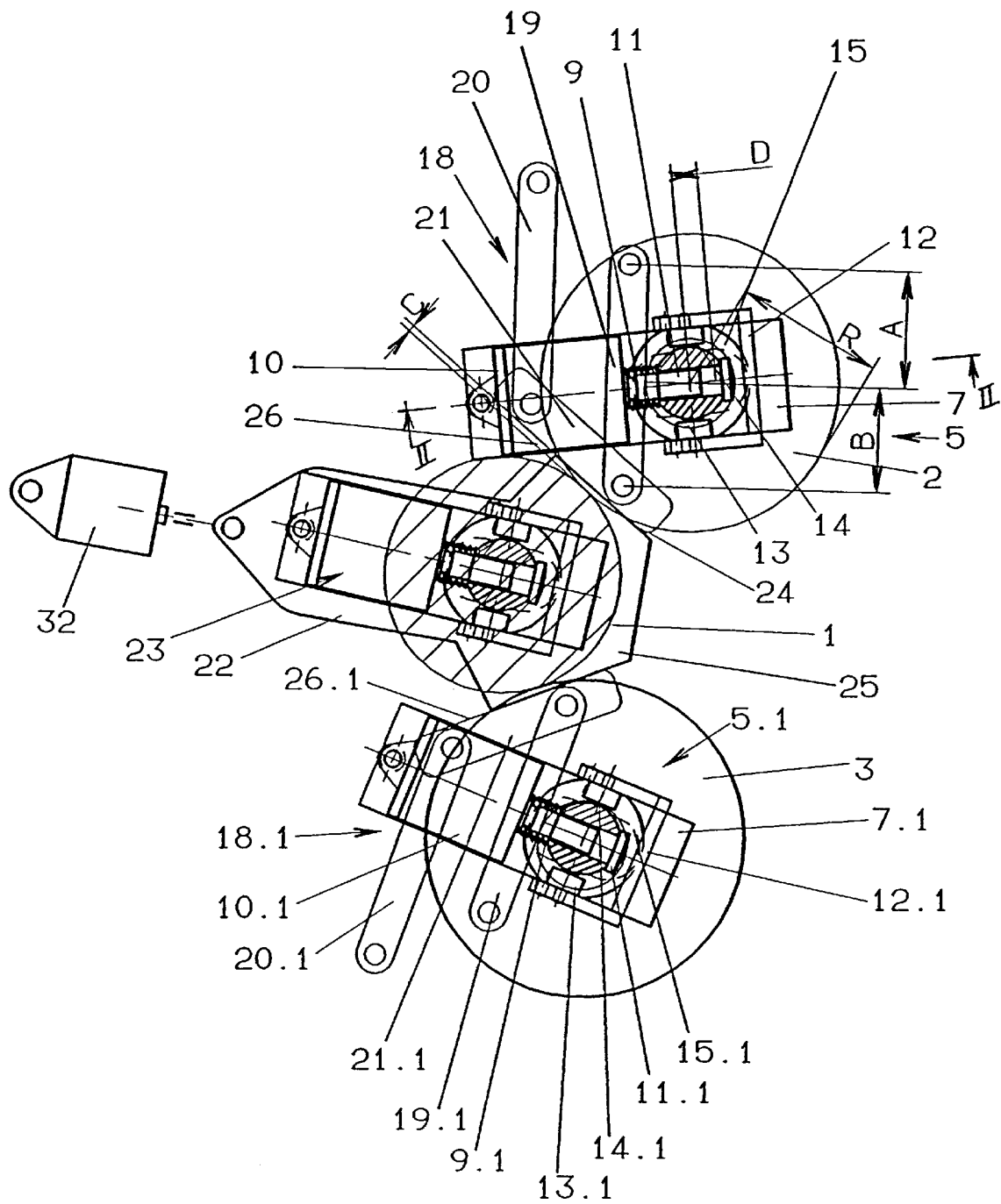
FIG. 1 is a view of a bearing assembly in accordance with the invention as viewed from a side wall of the printing press.
Figure 2:
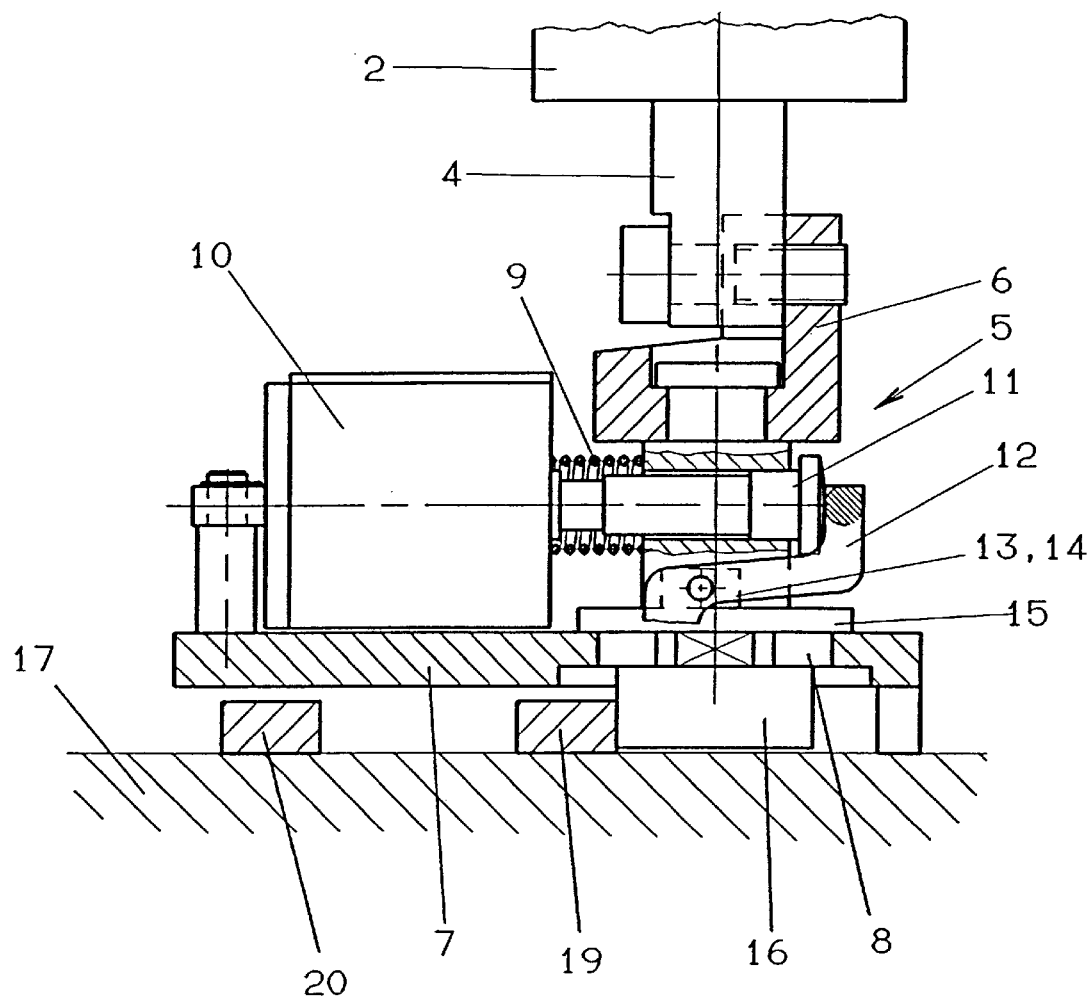
FIG. 2 is a partial sectional view of a roller bearing for a second roller of the inventive bearing assembly as viewed along line II—II in FIG. 1.

FIG. 1 shows a configuration of rollers that may be used in an inking device or a wetting device of a printing press. Specifically, a first roller 1 is positionable onto a second and third roller 2, 3. Journals 4 of the second and third rollers 2, 3 are held by roller bearings 5 and 5.1. Although only one side of the first, second, and third rollers 1, 2, and 3 is shown in FIG. 1, a symmetric set of rollers is arranged on an opposing printing unit side wall 17 (one of the roller bearings 5 mounted on side wall 17 is shown in FIG. 2). The specific embodiments of the roller bearings 5 are disclosed in DE Patent Application 197 19 305.6, which application is incorporated herein by reference in its entirety. The second roller 2 has a soft covering, such, for example, as rubber, and is positionable on cylinders or rollers that have a hard surface. These cylinders or rollers may, for example, be film rollers or distribution cylinders. For positioning and post-wear readjustment, the roller bearing 5 comprises a roller holder 6 that is movable in a straight guide 8 on a plate 7 of the roller bearing 5. The journal 4 of the roller 2 is screwed onto the roller holder 6. Other devices and methods of attaching the journal 4 to the roller holder 6 are also possible such, for example, as roller sockets. During positioning or repositioning, the second roller 2 is moved by the urgency of a compression spring 9 that acts on the roller holder 6 toward the partner rollers. After reaching its working position, the second roller 2 (which is not part of the subject-matter of this invention) is locked in its working position by a clamping mechanism. For this purpose, a working cylinder 10 of bearing 5 moves a tappet 11 against a clamping lever 12, which in turn presses a flange 15 against the plate 7 using pressure blocks 13, 14. As a result, the roller holder 6 is held on the plate 7 in a frictionlocking manner.

During the above described readjustment movement, a stop 16 is moved along with the second roller 2. Stop 16 is arranged concentric to the second roller 2 (see FIG. 2) on the roller holder 6. A quadrilateral mechanism 18 is arranged on the printing unit side wall 17 comprising cranks 19 and 20 which are connected to the side wall 17 at one end and to a coupling 21 at their other ends. Crank 19 rests against the stop 16. This crank 19 and crank 20 move coupling 21 relative to a position of the stop 16.

The third roller 3 is mounted in the same manner as the second roller 2. The same item numbers are therefore used for equivalent parts, whereby the parts for the third roller 3 are marked with an additional "0.1" suffix. For reason of brevity and convenience, the description of the third roller will not be described as being repetitious. The third roller 3 also has a soft covering, being positionable, for example, on one or more distribution cylinders.

The first roller 1 (acting, here, as a bridge roller) is movable into a gap between the second and third rollers 2, 3 and brought into contact with them. For this purpose, each journal of the first roller 1 is arranged in a roller bearing 23 on a carrier plate 22, which is run so as to be horizontally and vertically movable on the printing unit side wall 17. The roller bearing 23 used to mount the journal of the first roller 1 on the carrier plate 22 resembles, in structure and function, the roller bearings 5 and 5.1, so that a further detailed discussion is unnecessary. The carrier plate 22, has two side surfaces 24, 25 that converge in the direction of the second and third rollers 2, 3. These side surfaces 24, 25 of the carrier plate 22 rest on corresponding surfaces 26, 26.1 of the couplings 21, 21.1 when the rollers are in the working or print-ready position.

Figure 3:
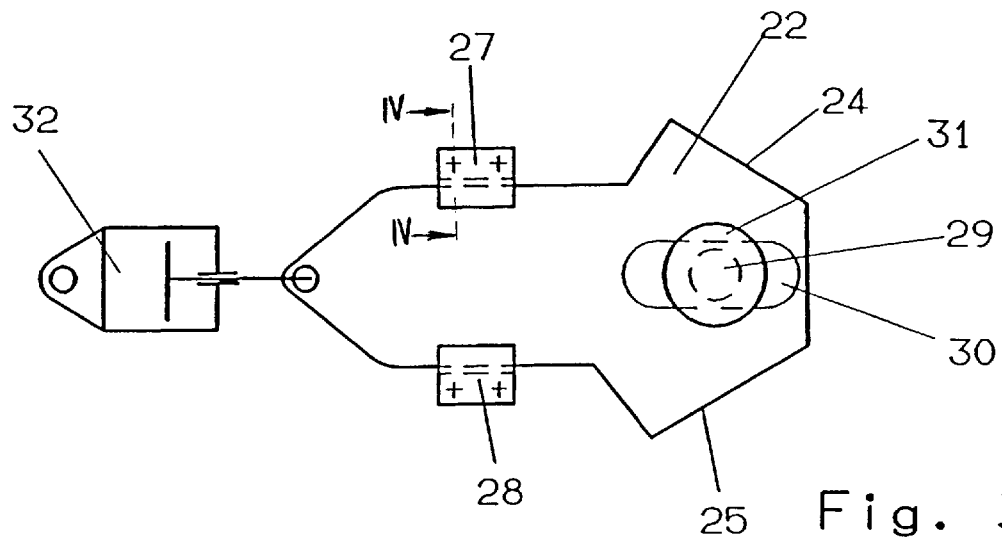
FIG. 3 is a view of the carrier plate for the bearing assembly of the first roller of the inventive bearing assembly shown in FIG. 1.
Figure 4:
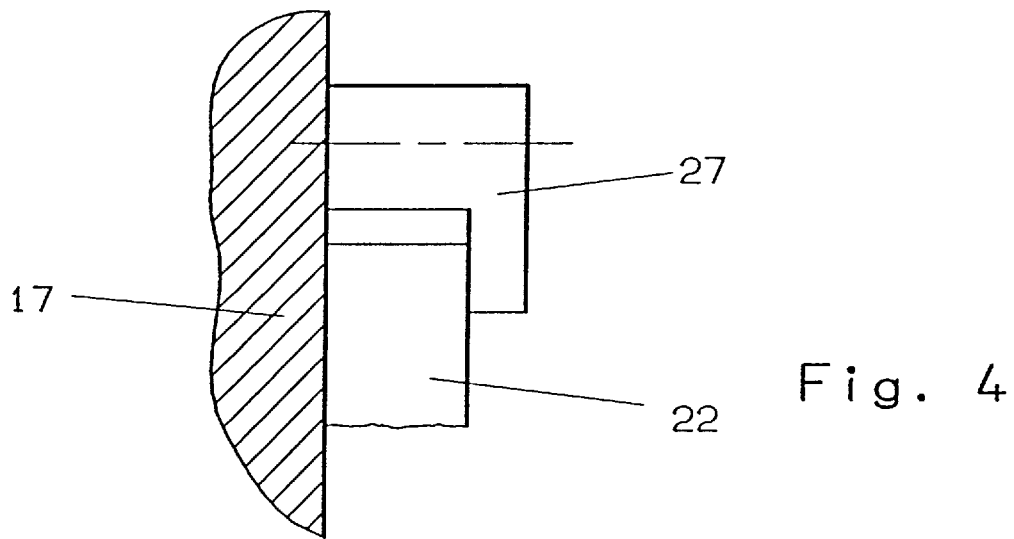
FIG. 4 is a partial sectional view of the carrier plate as viewed along line IV—IV in FIG. 3.

FIGS. 3 and 4 show how the carrier plate 22 is attached to the printing unit side wall 17. The carrier plate 22 is guided by holders 27, 28 that are screwed onto the printing unit side wall 17 and by a bolt 29 that has sufficient clearance in the cross-direction of a slot 30 and terminates with a disk or head 31, whereby adequate horizontal and vertical mobility of the carrier plate 22 on the printing unit side wall 17 is attained.

During operation, the working position of the second roller 2 changes depending on the wear-related reduction in the radius R of the second roller 2. For example, the roller 2 moves to the right in FIG. 1 by the amount D as wear occurs. During this movement of the roller 2, the crank 19 is readjusted while lying on the movable stop 16 so that the coupling 21 is displaced by the amount C. The stop 16 contacts the crank 19 at a point which divides the length of the crank 19 into sections A and B. The arrangement of stop 16 and crank 19 is designed so that the amount C is responsive to the largest possible change in the radius R. In practical terms, this design is undertaken constructively. The larger the amount D is relative to the change in the radius R, the larger Section A must be relative to Section B.

In the illustrated example, a pneumatic or hydraulic working cylinder 32 supported on the printing unit side wall 17 acts on the carrier plate 22. The working cylinder 32 moves the carrier plate 22 farther into the gap between the second and third roller 2, 3, to the extent allowed by the receding coupling 21 (Amount C). The carrier plate 22 is also readjusted in the same manner when the third roller 3 changes its working position, moving farther, due to diameter reduction, in the direction of its partner rollers. The carrier plate 22, with its surfaces 24, 25, thus remains at rest on the couplings 21, 21.1 at all times. The distance of the taken-along first roller 1 to the second and third rollers 2, 3, and thus the setting of the rollers 1, 2, 3 is therefore maintained in a sufficiently exact manner.

The quadrilateral mechanisms 18, 18.1 are embodied as double parallel cranks. The cranks 19 and 20 or 19.1 and 20.1 are of equal length so that the couplings 21, 21.1 move in parallel fashion. In the preferred embodiment, the couplings 21, in the central portion of their possible adjustment area, stand vertically on a connection line of the first roller 1 to the second roller 2, wherein the connection line is tangent to the point of contact between the first roller and the second roller 2. Coupling 21.1 is also similarly arranged with respect to the first and third roller 1, 3. The first roller 1 moves roughly in the direction of a line bisecting the angle between the aforementioned connection lines.

Figure 5:
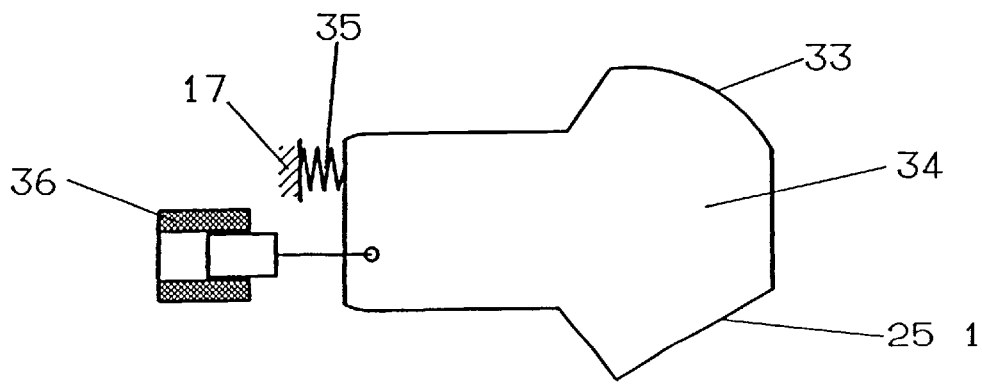
FIG. 5 shows another embodiment of a carrier plate of the inventive bearing assembly.

The readjustment directions of the second and third rollers 2, 3 may follow a curved path instead of being straight. As a result, positioning corrections relative to partner rollers of different diameters are possible. One of the surfaces 24, 25, 26, 26.1 may also be embodied in a convex manner. For example, FIG. 5 shows an embodiment of a carrier plate 34 having a convex surface 33. In this embodiment, the other surface 25.1 continues to be embodied as straight.

If the second or third roller 2, 3 is stationary and has a hard surface, the corresponding quadrilateral mechanism 18 or 18.1 may be omitted. In this case, the coupling 21 or 21.1 is replaced by a strip that is fixedly connected to the printing unit side wall 17 and carries a surface 26 or 26.1.

FIG. 5 also shows a further embodiment of a force element that acts on the carrier plate 34. In this embodiment, a compression spring 35 supported on the printing unit side wall 17 urges the carrier element 34 toward the second and third rollers 2, 3. Counter to the force effect of the compression spring 35, an electric lifting magnet 36 also acts on the carrier plate 34 when activated to pull the carrier plate 34 away from the second and third rollers 2, 3. The compression spring 35 readjusts the carrier plate 34, along with the first roller 1 arranged thereon, relative to the positions of the second and third rollers 2, 3. The compression spring 35 urges the surfaces 25.1 and 33 of the carrier plate 34 into contact with the surfaces 26 and 26.1 of the couplings 21 and 21.1. Instead of the surface 33, another of the surfaces 25, 26, 26.1 may be embodied in a convex manner.

The adjustment of second and third rollers 2, 3 using bearing 5 and 5.1 is effected when the first roller 1 is in the away position. When the roller bearing 23 is embodied as in FIG. 2, it is only necessary to release the clamping of the corresponding roller holder and withdraw the latter with the working cylinder (analogous to the working cylinder 10). However, it is advantageous, in adjusting the second and third rollers 2, 3, to relieve their rollers bearings 5, 5.1 from the contact forces of the cranks 19, 19.1, especially since these forces would combine with the positioning pressures of the second and third rollers 2, 3. To move the carrier plate 22 into the away position, the working cylinder 32 is reversed. In an embodiment of the force element as in FIG. 5, an electric lifting magnet is activated to draw the carrier plate 34 back against the force of the compression spring 35. After the adjustment of the second and third rollers 2, 3, the first roller 1 is positioned on the rollers 2, 3. To accomplish this, the carrier plate 22 or 34 is moved toward the couplings 21. In the embodiment of the roller bearing 23 shown in FIG. 2, the lock of the roller holder 6 is released, and the roller holder 6 is moved with the roller 1 with a defined force against the second and third rollers 2, 3. The defined force is supplied by a spring analogous to the compression spring 9. The roller holder 6 is then locked or clamped in the print-ready position. However, it is also possible to arrange a different roller bearing, such, for example, as one adjusted by twisting eccentric parts mounted on the carrier plate 22 or 34.

The invention is not limited by the embodiments described above which are presented as examples only but can be modified in various ways within the scope of protection defined by the appended patent claims.

I claim:

1. A bearing assembly for a movable first roller in a printing machine having a second roller mounted on a movable first bearing and a third roller mounted on a movable second bearing, said bearing assembly comprising:

a carrier plate movably mounted on a side wall of the printing machine and having a proximate end proximate said second and third rollers and a distal end remote from said second and third rollers;

said carrier plate further comprising two side edges converging toward said proximate end of said carrier plate;

a stop element mounted on each said movable first and second bearings;

a first quadrilateral mechanism having a crank resting on said stop on said movable first bearing and comprising a first coupling element connected to the crank;

a second quadrilateral mechanism having a crank resting on said stop on said movable second bearing and comprising a second coupling element connected to the crank;

wherein said first coupling element comprises a first surface and is positioned in response to a position of the crank of the first quadrilateral mechanism and wherein said second coupling element comprises a second surface and is positioned in response to a position of the crank of the second quadrilateral mechanism;

a roller holder mounted on said carrier plate for receiving and holding a journal of said first roller;

a first force element mounted on said carrier plate and urging said roller holder and said first roller toward a gap between said second and third rollers; and a second force element urging said carrier plate toward said second and third rollers so that said first and second side edges of said carrier plate abut said first and second surfaces of said first and second coupling elements, respectively.

2. The bearing assembly of claim 1, wherein said quadrilateral mechanism comprises a double parallel crank.

3. The bearing assembly of claim 1, wherein said side edges of said carrier plate and said first and second surfaces of the couplings are straight.

4. The bearing assembly of claim 1, wherein at least one of said side edges of said carrier plate and of said corresponding surfaces of said couplings comprise a convex shape.

5. The bearing assembly of claim 1, wherein said first force element comprises a reversible drive.

6. The bearing assembly of claim 1, wherein said second and third rollers are movable along a straight line.

7. The bearing assembly of claim 1, wherein said second force element comprises a working cylinder supported on said printing machine side wall.

8. The bearing assembly of claim 1, wherein said second force element comprises a spring acting on the carrier plate and an electric lifting magnet that is operable for countering the spring when activated.

9. The bearing assembly of claim 1, wherein said third roller is stationary and comprises a hard surface, and said second coupling comprises a stationary strip screwed onto the printing machine side wall having a second surface corresponding to said second side edge.

\* \* \* \* \*